(12) United States Patent
Okuno et al.

(10) Patent No.: US 8,084,519 B2
(45) Date of Patent: Dec. 27, 2011

(54) CURING ACCELERATOR FOR EPOXY RESIN COMPOSITION, AND ONE-PACK TYPE THERMOSETTING EPOXY RESIN COMPOSITION

(75) Inventors: Tsubasa Okuno, Hiratsuka (JP); Nao Sato, Hiratsuka (JP); Kazunori Ishikawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/128,198

(22) PCT Filed: Sep. 28, 2009

(86) PCT No.: PCT/JP2009/004946
§ 371 (c)(1),
(2), (4) Date: May 6, 2011

(87) PCT Pub. No.: WO2010/052823
PCT Pub. Date: May 14, 2010

(65) Prior Publication Data
US 2011/0213070 A1    Sep. 1, 2011

(30) Foreign Application Priority Data

Nov. 7, 2008  (JP) .................................. 2008-286992
May 26, 2009  (JP) .................................. 2009-126401

(51) Int. Cl.
*C08L 63/00*   (2006.01)
*C08G 59/66*   (2006.01)
*C08G 59/68*   (2006.01)

(52) U.S. Cl. .................... 523/455; 523/451; 523/466

(58) Field of Classification Search .................. None
See application file for complete search history.

(56) References Cited

U.S. PATENT DOCUMENTS 6,232,426 B1 * 5/2001 Orikabe et al. ................ 528/91
7,479,534 B2 * 1/2009 Amano et al. ................ 528/109

FOREIGN PATENT DOCUMENTS

| | | | |
|---|---|---|---|
| JP | 06-073163 A | | 3/1994 |
| JP | 07268071 A | * | 10/1995 |
| JP | 08-073566 A | | 3/1996 |
| JP | 08-283383 A | | 10/1996 |
| JP | 11-343332 A | | 12/1999 |
| JP | 2001-007258 A | | 1/2001 |
| JP | 2001-316451 A | | 11/2001 |
| JP | 2004-099778 A | | 4/2004 |
| JP | 2006290946 A | * | 10/2006 |
| JP | 2007-326906 A | | 12/2007 |

OTHER PUBLICATIONS

Machine translation of JP 07-268071, provided by the JPO website (no date).*
Machine translation of JP 2006-290946, provided by the JPO website (no date).*
Machine translation of JP 08-283383, provided by the JPO website (no date).*
Machine translation of JP 08-073566, provided by the JPO website (no date).*
Machine translation of JP 06-073163, provided by the JPO website (no date).*
Machine translation of JP 2001-007258, provided by the JPO website (no date).*

* cited by examiner

*Primary Examiner* — Michael J Feely
(74) *Attorney, Agent, or Firm* — Global IP Counselors, LLP

(57) ABSTRACT

A curing accelerator for epoxy resin compositions, which is used in a one-pack type epoxy resin composition having excellent storage stability and rapid curability. The curing accelerator for epoxy resin compositions contains a microcapsule type curing accelerator wherein a compound represented by formula (I) is encapsulated by a thermosetting resin. (In formula (I), $R^1$ and $R^2$ each represents a hydrogen atom or an alkyl group.)

$$\left( R^1 \underset{3}{\underbrace{\diagup\!\!\!\diagdown}} \right) PB \left( \underset{3}{\underbrace{\diagup\!\!\!\diagdown}} R^2 \right) \quad (I)$$

12 Claims, No Drawings

CURING ACCELERATOR FOR EPOXY RESIN COMPOSITION, AND ONE-PACK TYPE THERMOSETTING EPOXY RESIN COMPOSITION

CROSS-REFERENCE TO RELATED APPLICATIONS

This U.S. National stage application claims priority under 35 U.S.C. §119(a) to Japanese Patent Application No. 2008-286992, filed in Japan on Nov. 7, 2008, and to Japanese Patent Application No. 2009-126401, filed in Japan on May 26, 2009, the entire contents of Japanese Patent Application No. 2008-286992 and Japanese Patent Application No. 2009-126401 are hereby incorporated herein by reference.

FIELD OF THE INVENTION

The present invention relates to a curing accelerator for an epoxy resin composition, and to a one-pack type thermosetting epoxy resin composition.

BACKGROUND INFORMATION

A cured product that exhibits a high glass transition temperature is obtained by a composition that uses an aromatic diamine compound as a curing agent for an epoxy resin.

Japanese Patent Application Laid-Open No. 2007-326906 discloses a two-pack type curing resin composition that exhibits a high curing rate at room temperature and in which the first pack liquid that includes an epoxy resin exhibits excellent storage stability.

Furthermore, Japanese Patent Application Laid-Open No. 6-73163 and Japanese Patent Application Laid-Open No. 8-73566 disclose an epoxy resin composition which contains an epoxy resin, a curing agent, and a microcapsule phosphate curing accelerator, and Japanese Patent Application Laid-Open No. 11-343332 discloses an epoxy resin composition that contains a microcapsule curing agent and an epoxy resin.

When triphenylphosphine is used with a curing agent, such as a phenol resin, for an epoxy resin, the curing time for the composition is known to be reduced.

SUMMARY

However, when an aromatic polyamine compound is used as a curing agent for an epoxy resin, there is the disadvantage that a long curing time is required under a curing temperature condition of 80 to 250° C.

Furthermore, the inventors of the present application gained the insight that the curing time cannot be shortened when triphenylphosphine is used as a curing accelerator for a phenol resin used as an epoxy resin curing agent.

In addition, the inventors of the present application gained the insight that an epoxy resin composition that uses a curing accelerator formed as a microcapsule that encapsulates trisphenylphosphine triphenylborane, or tris (4-methylphenyl) phosphine triphenylborane for use in relation to a phenol resin used as a curing agent for an epoxy resin exhibits a curing time (gel time) of the same duration as when triphenylphosphine is used in relation to a phenol resin that is used as a curing agent for an epoxy resin.

The present inventors gained the insight that when a thiol curing agent is used as a curing agent for an epoxy resin, and triphenylphosphine triphenylborate and tris-paramethyl phenyl triphenylphosphine are used as a curing accelerator, there is the disadvantage that storage stability is adversely affected due to a requirement for cold storage or frozen storage although rapid curing performance is excellent.

In that context, the present invention has the object of providing a one-pack type epoxy resin composition that exhibits excellent storage stability and rapid curability, and a curing accelerator for an epoxy resin composition for use in conjunction with this type of one-pack type epoxy resin composition.

The present inventors conducted diligent research into finding a solution to the above problems, and completed the invention with the insight that a composition including an epoxy resin, a polythiol as a curing agent, and a microcapsule type curing accelerator, that encapsulates a compound expressed by a specific structure in a thermoplastic resin, as a curing accelerator can configure a one-pack type thermosetting epoxy resin composition that exhibits excellent storage stability and rapid curability.

In other words, the present invention provides a curing accelerator for an epoxy resin composition that includes a microcapsule type curing accelerator that encapsulates the compound expressed by Formula (I) below in a thermoplastic resin.

Chemical Formula 1

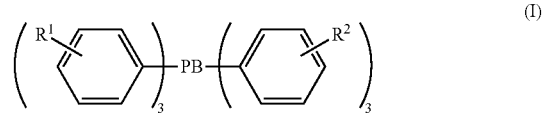

Wherein, in Formula (I), R1 and R2 respectively represent a hydrogen atom or an alkyl group.

Furthermore, the present invention provides a one-pack type thermosetting epoxy resin composition including an epoxy resin, a polythiol as a curing agent, and the above curing accelerator for an epoxy resin composition.

The one-pack type thermosetting epoxy resin composition including the above curing accelerator for an epoxy resin composition exhibits excellent storage stability and rapid curability.

Furthermore, the one-pack type thermosetting epoxy resin composition according to the present invention exhibits excellent storage stability and rapid curability.

DESCRIPTION OF EMBODIMENTS

The details of the present invention will be described hereafter.

The one-pack type thermosetting epoxy resin composition according to the present invention is a composition that includes a polythiol as a curing agent, and a microcapsule type curing accelerator that encapsulates the compound expressed by Formula (I) below in a thermoplastic resin.

Chemical Formula I

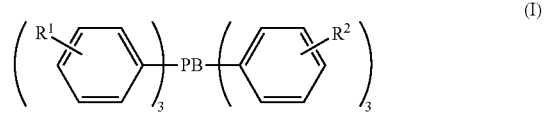

Wherein, in Formula (I), R1 and R2 respectively represent a hydrogen atom or an alkyl group.

The one-pack type thermosetting epoxy resin composition according to the present invention may be referred to below as "the composition according to the present invention".

The epoxy resin will be described below.

There is no particular limitation on the epoxy resin included in the composition according to the present invention as long as the compound includes at least two epoxy groups on average per molecule. Examples include polyhydric phenols such as bisphenol A, bisphenol F, bisphenol AD, catechol, resorcinol, or the like, a polyglycidyl ether obtained by reacting epichlorohydrin with a polyvalent alcohol such as glycerine or polyethylene glycol, a glycidyl ether ester obtained by reacting epichlorohydrin with a hydroxy carboxylic acid such as p-hydroxybenzoic acid or β-hydroxynaphthoic acid, a polyglycidyl ester obtained by reacting epichlorohydrin with a polycarboxylic acid such as phthalic acid or terephthalic acid, epoxidized phenolic novolac resin, epoxidized creosol novolac resin, epoxidized polyolefin, cycloaliphatic epoxy resin, urethane modified epoxy resin, dicyclopentadiene epoxy resin, a glycidylamine epoxy resin obtained from 4,4-diaminodiphenylmethane or m-aminophenol, or the like, a naphthalene epoxy resin, and a biphenyl epoxy resin, or the like.

In view of forming a cured substance that exhibits excellent storage stability and rapid curability in addition to a high glass transition temperature, an epoxy resin such as bisphenol A epoxy resin, dicyclopentadiene epoxy resin, or glycidylamine epoxy resin is preferred.

Each of the epoxy resin can be used alone or in combinations of two or more.

The polythiol will be described below.

The polythiol according to the present invention (hereinafter referred to as the "thiol curing agent") is used as a curing agent for the epoxy resin.

The polythiol included in the composition according to the present invention is a compound that includes at least two mercapto groups (—SH) per molecule.

The number of mercapto groups included in one molecule of polythiol is preferably 2 to 20, and 3 to 10 still more preferable, in view of enabling formation of a cured substance that has a high glass transition temperature and that exhibits excellent storage stability, rapid curability.

The polythiol includes a mercapto-containing hydrocarbon compound that includes at least two mercapto groups (—SH) per molecule, and a mercapto-containing silicone that includes at least two mercapto groups (—SH) per molecule.

The mercapto-containing silicone that includes at least two mercapto groups (—SH) per molecule has a main chain of silicone.

The mercapto group in the mercapto-containing silicone enables direct bonds with the main chain of the mercapto-containing silicone. The mercapto group enables bonding through an organic group with the main chain of the mercapto-containing silicone.

There is no particular limitation on the organic group that mediates the mercapto group and the main chain of the mercapto-containing silicone as long as it is a bivalent hydrocarbon group. The bivalent hydrocarbon group for example may include a hetero atom such as an oxygen atom, nitrogen atom, or sulfur atom. The bivalent hydrocarbon group includes for example an aliphatic hydrocarbon group (the aliphatic hydrocarbon group may include an unsaturated bond), a cycloaliphatic hydrocarbon group (the cycloaliphatic hydrocarbon group may include an unsaturated bond), and an aromatic hydrocarbon group, or a hydrocarbon group that is a combination thereof. Of these hydrocarbon groups, an aliphatic hydrocarbon group is preferred in view of exhibiting excellent rapid curability. The aliphatic hydrocarbon group may include 1 to 6 carbon atoms. More specifically, examples include a methylene group, an ethylene group, a trimethylene group, a tetramethylene group, a pentamethylene group, and a hexamethylene group.

In addition to a mercapto group, the main chain of the mercapto-containing silicone may include an alkoxy group such as a methoxy group or an ethoxy group, or an alkyl group such as a methyl group or an ethyl group.

The mercapto-containing silicone includes a compound as expressed by Formula (II) below. The mercapto-containing silicone is preferably in the form of the compound expressed by Formula (II) in view of forming a cured substance that exhibits excellent storage stability and rapid curability and has a high glass transition temperature.

Chemical Formula II

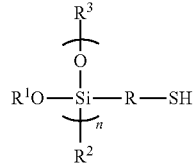

(II)

Wherein, R1 is an alkyl group, R is an alkylene group, R2 is an alkyl group or an alkoxy group, R3 is a alkyl group, and n is an integer greater than or equal to 2.

The alkyl group for example, includes a methyl group or an ethyl group.

The alkylene group includes a hydrocarbon having 2 to 6 carbon atoms, and more specifically, includes a methylene group, an ethylene group, a trimethylene group, a tetramethylene group, a pentamethylene group, and a hexamethylene group.

R2 is an alkyl group or an alkoxy group, and more specifically, includes a methyl group, an ethyl group or a methoxy group, or an ethoxy group. R3 is an alkyl group including for example a methyl group.

n is an integer greater than or equal to 2, and preferably takes a value of 5 to 10, and more preferably 6 to 8, in view of obtaining a cured substance that has a high glass transition temperature (glass transition point) and excellent rapid curability and storage stability.

The compound expressed in Formula (II) includes a compound expressed in Formula (III) below. The compound expressed in Formula (II) is preferably embodied by the compound expressed in Formula (III) in view of obtaining a cured substance that has a high glass transition temperature and excellent rapid curability and storage stability.

Chemical Formula III

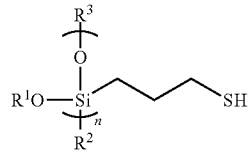

(III)

Wherein, R1 is an alkyl group, R2 is an alkyl group or an alkoxy group, R3 is a alkyl group, and n is an integer greater than or equal to 2. R1, R2, R3 and n respectively have the same definitions as above.

The mercapto-containing hydrocarbon compound that includes at least two mercapto groups per molecule for example may include a hetero atom such as an oxygen atom, nitrogen atom, or sulfur atom.

The mercapto-containing hydrocarbon compound that includes at least two mercapto groups per molecule for example includes compounds expressed by Formulae (1), (2), (3), (4), (5) below.

Chemical Formula 1

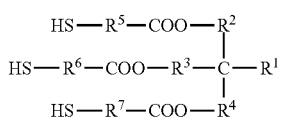

(1)

Wherein, R1 is an alkyl group having 1 to 6 carbon atoms, and R2-R7 are respectively an alkylene group having 1 to 10 carbon atoms.

Chemical Formula 2

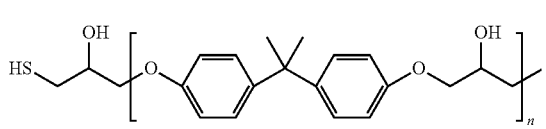

(2)

Wherein, n is an integer greater than or equal to 1.

Chemical Formula 3

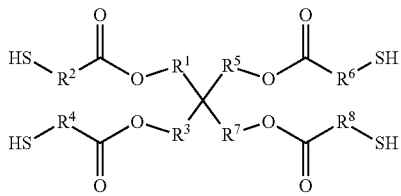

(3)

Wherein, R1 to R8 are respectively a hydrocarbon group (for example, an alkylene group).

Chemical Formula 4

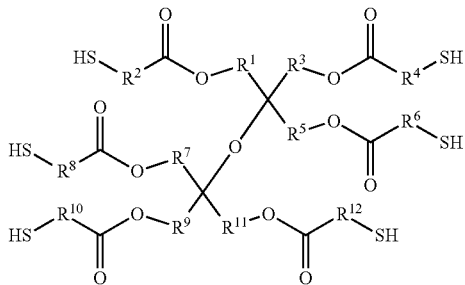

(4)

Wherein, R1 to R12 are respectively a hydrocarbon group (for example, an alkylene group).

Chemical Formula 5

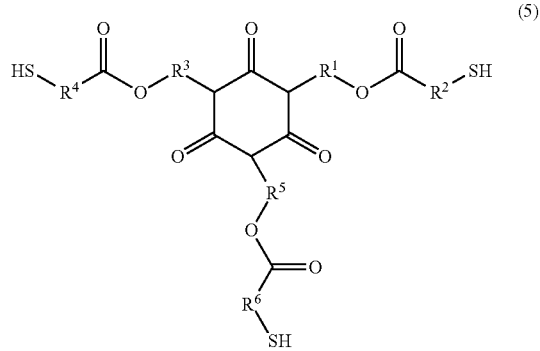

(5)

Wherein, R1 to R6 are respectively a hydrocarbon group (for example, an alkylene group).

The hydrocarbon compound that includes at least two mercapto groups per molecule is preferably a compound as expressed by Formula (1) in view of exhibiting excellent storage stability and rapid curability.

The compound expressed by Formula (1) for example includes trimethylolpropane tristhioglycolate, or trimethylolpropane tristhiopropionate.

The compound expressed by Formula (1) is preferably trimethylolpropane tristhioglycolate, or trimethylolpropane tristhiopropionate in view of exhibiting excellent storage stability and rapid curability.

Each of the polythiol can be used alone or in combinations of two or more.

There is no particular limitation on the manufacture of the polythiol and for example, a known conventional method may be employed.

The amount of polythiol is preferably an amount such that the amount of active hydrogen (active hydrogen in the mercapto group) included in the polythiol has an equivalent amount of 0.5 to 2.5, and more preferably an equivalent amount of 0.7 to 2.0, relative to the epoxy groups in the epoxy resin (active hydrogen/epoxy groups) in view of enabling a cured substance that exhibits excellent storage stability and rapid curability, and has a high glass transition temperature.

The microcapsule type curing accelerator will be described hereafter.

The microcapsule type curing accelerator included in the composition according to the present invention is configured by covering a curing accelerator as expressed by Formula (I) below in a thermoplastic resin.

In the present invention, the microcapsule type curing accelerator includes a core formed from the curing accelerator as expressed by Formula (I), and a shell formed from a thermoplastic resin. The thermoplastic resin may cover at least a part or the whole of the surface of the core.

The compound expressed by Formula (I) will be described hereafter.

In the compound according to the present invention, the compound expressed by Formula (I) is used as a curing accelerator.

The compound represented by Formula (I) that contains the compound according to the present invention has the structure represented below.

Chemical Formula I

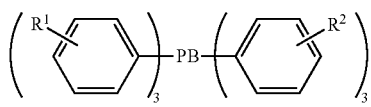

Wherein, R1 and R2 are respectively a hydrogen atom or an alkyl group.

R1 denotes a hydrogen atom and an alkyl group. R2 denotes a hydrogen atom and an alkyl group.

R1, R2 may be the same or different. A plurality of R1 may be the same or different. A plurality of R2 may be the same or different.

The alkyl group preferably includes 1 to 6 carbon atoms, and more preferably 1 to 3 carbon atoms in view of achieving excellent curability and a higher glass transition temperature. More specifically, the alkyl group includes a methyl group, an ethyl group, and a propyl group.

The compound expressed by Formula (I) for example may include the compound expressed by Formula (6) or the compound expressed by Formula (7).

Chemical Formulas 6 and 7

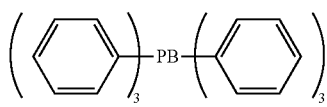

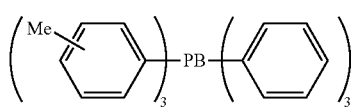

The composition according to the present invention preferably includes the compound expressed by Formula (6) and/or the compound expressed by Formula (7) in view of achieving excellent curability and a higher glass transition temperature.

The chemical name of the compound expressed in Formula (6) is triphenylphosphine triphenylborate, and will be referred to as "TPP-S" in the present specification.

The chemical name of the compound expressed in Formula (7) is tris-paramethyl phenyl phosphine triphenylborate, and will be referred to as "TPTP-S" in the present specification.

There is no particular limitation on the method of manufacturing the compound expressed in Equation (I). A commercially available product may be used as the compound expressed in Equation (I).

The compound expressed in Equation (I) preferably has an average particle diameter of 0.1-100 μm in view of achieving excellent curability and storage stability. In the present invention, the average particle diameter of the compound expressed in Equation (I) is measured using a nano-particle diameter distribution measurement apparatus SALD-7100 (manufactured by Shimadzu Corporation).

Each of the compounds expressed by Formula (I) can be used alone or in combinations of two or more.

The amount of the curing accelerator expressed in Formula (I) is preferably 1 to 50 parts by mass, and more preferably 1 to 30 parts by mass relative to 100 parts by mass of the epoxy resin in view of achieving excellent storage stability, excellent rapid curability, and a cured substance that has a higher glass transition temperature.

The composition according to the present invention includes a microcapsule type curing accelerator that encapsulates the compound expressed by Equation (I) above in a thermoplastic resin.

The microcapsule type curing accelerator according to the present invention includes a core of the compound expressed by Equation (I), and a shell of thermoplastic resin.

It is preferred that the compound expressed in Equation (I) is solid at a temperature of 25 to 70° C. (or has a melting point of more than 70° C.) in view of facilitating formation of a microcapsule when manufacturing the microcapsule type curing accelerator.

There is no particular limitation on the thermoplastic resin used as the shell. Examples include a urethane resin; a styrene butadiene elastomer; a polyvinyl acetal resin; a phenoxy resin; a poly (methyl methacrylate) resin; a polyvinyl alcohol; a polymer obtained from a monofunctional monomer such as a (meth)acrylic monomer, for example, an alkyl ester having 1 to 8 carbon atoms such as an acrylic ester, an itaconic acid ester, a crotonic acid ester or the like, or a substance in which a part or the whole of the hydrogen atoms of an alkyl group of the alkyl ester is substituted by aryl groups, or the like, a styrene, an alpha-methylstyrene, an acrylonitrile, a methacrylonitrile, vinyl acetate or the like, or a polyfunctional monomer such as ethylene glycol, (meth) acrylate, polyethylene glycol di(meth) acrylate, divinylbenzene, bisphenol A di(meth)acrylate, methylene-bis(meth)acrylamide, or the like.

Each of the thermoplastic resin can be used alone or in combinations of two or more.

Of the above compounds, at least one compound selected from the group consisting of urethane resin, styrene butadiene elastomer, polyvinyl acetal resin, polyvinyl alcohol, and a phenoxy resin is preferred in view of maintaining a glass transition temperature in the resulting cured substance, and obtaining excellent storage stability, rapid curability, and excellent film formability and mechanical strength.

There is no particular limitation on the urethane resin as long as the compound includes a urethane bond. Examples include a substance obtained by reacting a type of polyvalent isocyanate and a type of polyvalent amine, a substance obtained by reacting a type of polyvalent isocyanate and water, a substance obtained by reacting a type of polyvalent isocyanate and a polyvalent alcohol, and a substance obtained by reacting a type of polyvalent isocyanate, a type of polyvalent amine, and a polyvalent alcohol.

The type of polyvalent isocyanate used in the manufacture of the urethane resin may be any compound that includes at least two isocyanate groups per molecule. More specifically, examples include aromatic polyisocyanates such as m-phenylene diisocyanate, p-phenylene diisocyanate, 2,4-tolylene diisocyanate, 2,6-tolylene diisocyanate, naphthalene-1,4-diisocyanate, 4,4'-diphenylmethane diisocyanate, 3,3'-dimethoxy-4,4'-biphenyl diisocyanate, 3,3'-dimethyldiphenylmethane-4,4'-diisocyanate, 4,4'-dimethyldiphenylmethane-2,2,5,5'-tetraisocyanate; a polyisocyanate in which the isocyanate group is bonded to an alkylene group that includes an aromatic hydrocarbon group such as xylylene-1,4-diisocyanate, an aliphatic polyisocyanate such as trimethylene diisocyanate, hexamethylene diisocyanate, propylene-1,2-diisocyanate, butylene-1,2-diisocyanate, and lysine diisocyanate; a cycloaliphatic polyisocyanate such as cyclohexylene-1,2-diisocyanate, and cyclohexylene-1,4-diisocyanate; an addition product of hexamethylene diisocyanate and hexanetriol, an addition product of 2,4-tolylene diisocyanate and brenz catechol, an addition product of tolylene diisocyanate and hexanetriol, an addition product of tolylene diisocyanate and trimethylolpropane, an addition product of xylylene diisocyanate and trimethylolpropane, and an addition product of hexamethylene diisocyanate and trimethylolpropane.

Of the above compounds, at least one compound selected from the group consisting of an aromatic polyisocyanate such as tolylene diisocyanate, 4,4'-diphenylmethane diisocyanate, p-phenylene diisocyanate, xylylene diisocyanate is preferred in view of maintaining a glass transition temperature in the resulting cured substance, and obtaining excellent storage stability, rapid curability, and excellent film formability and mechanical strength.

The type of polyvalent amine used in the manufacture of the urethane resin may be any compound that includes at least two amino groups per molecule. More specifically, examples include an aliphatic polyamine such as diethylene triamine, triethylene tetramine, tetraethylene pentamine, 1,6-hexamethylene diamine, 1,8-octamethylene diamine, or 1,12-dodecamethylene diamine; an aromatic polyamine such as o-phenylene diamine, m-phenylene diamine, and p-phenylene diamine, a polyamine in which an amino group is bonded to an alkylene group that contains an aromatic hydrocarbon group such as o-xylylene diamine, m-xylylene diamine, p-xylylene diamine; a cycloaliphatic polyamine such as methane diamine, bis(4-amino-3-methylcyclohexyl) methane, isophorone diamine, and 1,3-diaminocyclohexane; and a spiroacetal diamine.

Each of the polyvalent amine can be used alone or in combinations of two or more.

The polyvalent alcohol used in the manufacture of the urethane resin may be any of an aliphatic, aromatic or cycloaliphatic species. Examples include catechol, resorcinol, 1,2-dihydroxy-4-methylbenzene, 1,3-dihydroxy-5-methylbenzene, 3,4-dihydroxy-1-methylbenzene, 3,5-dihydroxy-1-methylbenzene, 2,4-dihydroxyethylbenzene, 1,3-naphthalene diol, 1,5-naphthalene diol, 2,7-naphthalene diol, 2,3-naphthalene diol, o,o'-biphenol, p,p'-biphenol, bisphenol A, bis-(2-hydroxyphenyl) methane, xylylene diol, ethylene glycol, 1,3-propylene glycol, 1,4-butylene glycol, 1,5-pentane diol, 1,6-hexane diol, 1,7-heptane diol, 1,8-octane diol, 1,1,1-trimethylol propane, hexane triol, pentaerythritol, glycerine, sorbitol, and the like.

Each of the polyvalent alcohol can be used alone or in combinations of two or more.

There is no particular limitation on the styrene butadiene elastomer, and for example, a known conventional substance may be used.

The weight average molecular weight of the styrene butadiene elastomer is preferably 12000-50000 in view of obtaining excellent storage stability and rapid curability.

In the present invention, the weight average molecular weight is taken to be the weight average molecular weight for a polystyrene conversion using gel permeation chromatography (GPC) employing tetrahydrofuran as a solvent.

There is no particular limitation on the polyvinyl acetal resin and, for example, it may include polyvinyl formal resin, or polyvinyl butyral resin.

The weight average molecular weight of the polyvinyl acetal resin is preferably 10000-60000 in view of obtaining excellent storage stability and rapid curability.

There is no particular limitation on the polyvinyl alcohol and, for example, it may include a known and conventional substance. The weight average molecular weight of the polyvinyl alcohol is preferably 10,000-150,000 in view of obtaining excellent storage stability and rapid curability.

There is no particular limitation on the phenoxy resin, and for example, it may be a high molecular weight epoxy resin having a molecular weight of at least 10,000 selected from bisphenol A and/or bisphenol F.

There is no particular limitation on the method of microcapsule formation, and for example, it may be a known and conventional method.

Each of the microcapsule type curing accelerator can be used alone or in combinations of two or more.

At least one microcapsule type curing accelerator including a shell material selected from the group consisting of phenoxy resin, polyvinyl alcohol, polyvinyl acetal resin, styrene butadiene elastomer, and urethane resin is preferred in view of obtaining excellent storage stability, rapid curability, and excellent film formability and mechanical strength.

It is preferred that the amount of the thermoplastic resin used in the microcapsule type curing accelerator is 1-50 mass % of the overall composition to maintain the glass transition temperature in the resulting cured substance, and to obtain excellent storage stability, rapid curability, and excellent film formability and mechanical strength.

It is preferred that the amount of the thermoplastic resin used in the microcapsule type curing accelerator is 1-50 parts by mass, and still more preferred 1-30 parts by mass relative to 100 parts by mass of the epoxy resin to maintain the glass transition temperature in the resulting cured substance, and to obtain excellent storage stability, rapid curability, and excellent film formability and mechanical strength.

The average particle diameter (diameter) of the microcapsule type curing accelerator is preferably 0.1-50 (units; microns) in view of obtaining excellent storage stability and rapid curability. The average particle diameter in the present invention is measured using a nano-particle diameter distribution measurement apparatus SALD-7100 (manufactured by Shimadzu Corporation).

The shell thickness of the microcapsule type curing accelerator is preferably 0.01-10 (units; microns) in view of obtaining excellent storage stability, rapid curability and excellent film formability and mechanical strength. The shell thickness in the present invention is measured using a nano-particle diameter distribution measurement apparatus SALD-7100 (manufactured by Shimadzu Corporation).

The epoxy resin composition according to the present invention may further contain a globular silica.

Globular silica will be described below. The globular silica contained in the composition according to the present invention is hydrophobic globular silica (hydrophobic silica minute particles). A preferred embodiment of the globular silica is globular silica minute particles whose surface is precessed to be hydrophobic.

The average particle diameter of the globular silica is preferably 20-200 nm, and still more preferably 20-100 nm in view of obtaining excellent storage stability.

In the present invention, the average particle diameter of the globular silica is such that a fluid dispersal is formed by dispersing globular silica in a solvent such as methanol, and then measuring the fluid dispersal is measured using a nano-particle diameter distribution measurement apparatus SALD-7100.

There is no particular limitation on the method of manufacturing the globular silica, and for example, a known and conventional method may be used. A commercially available product may be used as the globular silica. Examples include the product name X-24-9404 (Shin-Etsu Chemical Co., Ltd.) and the product name X-24-9163A (Shin-Etsu Chemical Co., Ltd.). Each of the globular silica can be used alone or in combinations of two or more.

It is preferred that the amount of the globular silica is at least 30 mass %, and more preferably 40-95 mass %, and yet more preferably 50-90 mass % of the total amount of the microcapsule type curing accelerator and the globular silica in view of obtaining excellent storage stability, rapid curability, and excellent physical properties in the cured substance.

In the present invention, a preferred embodiment is that the microcapsule type curing accelerator is covered with the globular silica in view of obtaining excellent storage stability. The globular silica may cover a portion or the whole of the surface of the microcapsule type curing accelerator.

The microcapsule type curing accelerator that is further coated with the globular silica (silica microcapsule type curing accelerator) for example may be manufactured by at least mixing the microcapsule type curing accelerator with the globular silica. The globular silica may thereby attach to the surface of the microcapsule type curing accelerator as a result of static electricity produced during manufacturing processes.

The composition according to the present invention may further contain an additive as required in addition to the microcapsule type curing accelerator, the curing agent, and the epoxy resin. The additive may include for example a curing agent other than a polythiol, a filling agent (filler), a reactive diluent, a plasticizer, a thixotropy imparting agent, a pigment, a dye, an age resistor, an antioxidant, an antistatic agent, a fire retardant, an adhesion imparting agent, a dispersing agent, and a solvent.

There is no particular limitation on the manufacture of the composition according to the present invention. For example, the composition according to the present invention can be manufactured as a one-pack composition by application of sufficient mixing of an epoxy resin, a microcapsule type curing accelerator that encapsulates a compound expressed by Formula (I), a globular silica, a curing agent and an additive that may be used as required by use of a stirring apparatus such as a mixer in a nitrogen atmosphere or under reduced pressure. In the method of manufacture the resulted composition may include the silica microcapsule type curing accelerator.

In order to enable a large amount of the silica microcapsule type curing accelerator to be contained within the system and to enable excellent storage stability for the resulted composition, a method may be employed in which the microcapsule type curing accelerator and the globular silica are mixed in advance, and the epoxy resin, thiol curing agent, and an additive agent that is used as required are mixed into that resulted mixture.

The measurement of viscosity in the present invention is performed using an E-type viscosity meter VISCONIC EHD-model (manufactured by Toki Sangyo Co., Ltd.) at 25° C.

The composition according to the present invention preferably exhibits a viscosity increase rate of 10% or less relative to an initial viscosity after standing for 24 hours at 25° C., and 9% or less is more preferred.

The composition according to the present invention exhibits excellent storage stability and can be stored for a long period of time at room temperature (20-30° C.).

In contrast, a convention composition that contains the compound expressed in Formula (I) requires cold storage or frozen storage.

The temperature when curing the composition according to the present invention is preferably 100-250° C., and more preferably 120-200° C. in view of obtaining excellent rapid curability, and a high glass transition temperature in the resulted cured substance.

In view of obtaining excellent rapid curability, it is preferable that the composition according to the present invention exhibits a gel time at 150° C. of less than two minutes (120 seconds), more preferably less than 60 seconds, and still more preferably less than 50 seconds.

The gel time of the present invention is measured using a method that complies with JIS C2161: 1997.

The composition according to the present invention can be used for example as an adhesive (for example, for construction, electrical, electronic or automotive applications), a dye, an engineering product, a transportation product, a medical product, a wrapping product, a fiber, or as a sport or leisure product.

Adherends that are capable of application of the composition of the present invention include for example, metals, glass, plastics, mortar, concrete, rubber, timber, leather, cloth, and paper.

There is no particular limitation on the method of applying the composition according to the present invention to an adherend, and for example, a known and conventional method may be employed.

The curing accelerator for an epoxy resin composition according to the present invention will be described below.

The curing accelerator for an epoxy resin composition according to the present invention includes a microcapsule type curing accelerator in which the curing accelerator expressed by Formula (I) below is encapsulated by a thermoplastic resin.

Chemical Formula I

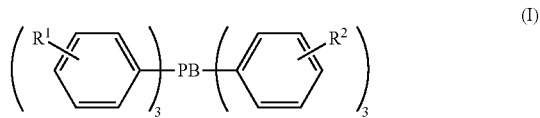

Wherein, R1, R2 are respectively a hydrogen atom or an alkyl group.

The thermoplastic resin and the curing accelerator expressed by Formula (I) that is used in the microcapsule type curing accelerator respectively have the same definition in relation to substances used in the epoxy composition according to the present invention.

There is no particular limitation on the manufacture of the microcapsule type curing accelerator, and for example, manufacture may be performed in the same manner as the microcapsule type curing accelerator used in the composition according to the present invention.

The microcapsule type curing accelerator may be used as a curing accelerator for an epoxy resin composition.

The curing accelerator for an epoxy resin composition according to the present invention may further include the hydrophobic globular silica.

The hydrophobic globular silica has the same definition as the silica used in relation to the composition according to the present invention.

The hydrophobic globular silica in the curing accelerator for an epoxy resin composition according to the present invention may cover a part or the whole of the microcapsule type curing accelerator.

The silica microcapsule type curing accelerator will be described below.

The silica microcapsule type curing accelerator includes a core of the curing accelerator expressed by Formula (I), and the core is covered by a thermoplastic resin (first shell). The thermoplastic resin is then covered by the hydrophobic globular silica (second shell).

There is no particular limitation on the manufacture of the silica microcapsule type curing accelerator. For example, manufacture may be executed by mixing the microcapsule type curing accelerator in which the curing accelerator expressed by Formula (I) is covered by the thermoplastic resin, with the globular silica.

The silica microcapsule type curing accelerator may be used as a curing accelerator for an epoxy resin composition.

EXAMPLES

The present invention will be described in further detail below making reference to examples.

1. Evaluation

The gel time, viscosity and viscosity increase rate of the composition obtained as described below was evaluated using the following method. The results are shown in Table 1 to Table 3.

(1) Gel Time (Rapid Curability)

Rapid curability was measured by gel time on a hot plate at 150° C. according to JIS C2161: 1997. More specifically, 0.1 g of the composition obtained as described below is placed on a hot plate, and mixed with a metal bar at a speed of 60±5 revolutions per minute. The time from the initiation of evaluation until the composition transforms to a gel state (for example, when the overall composition no longer undergoes blending, or no longer adheres to the metal tip) is taken to be the gel time.

(2) Viscosity

The measurement of an initial viscosity of the composition obtained as described below is performed using an E-type viscosity meter VISCONIC EHD-model (manufactured by Toki Sangyo Co., Ltd.) at 25° C.

After storing the composition obtained as described below for 24 hours at 25° C. in a thermostatic bath, the viscosity of the composition (viscosity after storage) was measured in the same manner as the initial viscosity.

(3) Viscosity Increase Rate (Storage Stability)

The value for the initial viscosity and the viscosity after storage are input to the following equation to thereby calculate the viscosity increase rate.

Viscosity increase rate (%)=(viscosity after storage−initial viscosity)/initial viscosity×100

An evaluation standard for the viscosity increase rate was adapted so that a value of 10% or less was capable of use as a one-pack thermosetting epoxy resin composition.

2. Microencapsulation of Compound expressed by Formula (I) (Manufacture of Microcapsule Having a Core of the Compound Expressed by Formula (I))

The microcapsule was prepared using a spray dry method using a spray drying apparatus GS310 manufactured by Yamato Scientific Co., Ltd.

(1) Microcapsule Having Thickness Corresponding to 10 mass % of the Core Weight

A powdered substance (microcapsule having a thickness of 10 mass %) is obtained by mixing 50 g of a curing accelerator solution which TPP-S (10 g, melting point 205° C., Hokko Chemical Industry Co., Ltd., same hereafter) (or TPTP-S, 10 g, melting point 171° C., Hokko Chemical Industry Co., Ltd., same hereafter) suspended in a solvent: ethyl acetate (40 g), and a thermoplastic resin solution dissolved in a solvent: ethyl acetate (9 g) (1 g of thermoplastic resin in the solvent), and spray drying using the above spray drying apparatus.

(2) Microcapsule Having Thickness Corresponding to 20 mass % of the Core Weight

A powdered substance (microcapsule having a thickness of 20 mass %) is obtained by mixing 50 g of a curing accelerator solution which TPP-S (10 g) (or TPTP-S, 10 g) is suspended in a solvent: ethyl acetate (40 g), and a thermoplastic resin solution dissolved in a solvent: ethyl acetate (18 g) (2 g of thermoplastic resin in the solvent), and spray drying using the above spray drying apparatus.

(1) TPP-S @MC1

Shell agent: A microcapsulation process was executed so that a urethane resin Desmocoll 500 (Bayer Holding Ltd., same below) exhibits a thickness of 10 mass % relative to the core (TPP-S). The resulting microcapsule was denoted as TPP@MC1. The average particle diameter of TPP@MC1 is 10 μm.

(2) TPP-S @MC2

Shell agent: A microcapsulation process was executed so that a urethane resin Desmocoll 500 exhibits a thickness of 20 mass % relative to the core (TPP-S). The resulting microcapsule was denoted as TPP@MC2. The average particle diameter of TPP@MC2 is 11 μm.

(3) TPP-S @MC3

Shell agent: A microcapsulation process was executed so that a styrene butadiene elastomer. TUFPREN912 (Asahi Kasei Corporation, block polymer, the same hereafter) exhibits a thickness of 10 mass % relative to the core (TPP-S). The resulting microcapsule was denoted as TPP@MC3. The average particle diameter of TPP@MC3 is 10 μm.

(4) TPP-S @MC4

Shell agent: A microcapsulation process was executed so that a polyvinyl acetal resin KS10 (Sekisui Chemical Co., Ltd., weight average molecular weight 56,000, hydroxy group 18 mol %, degree of acetalization 80 mol %, same hereafter) exhibits a thickness of 10 mass % relative to the core (TPP-S). The resulting microcapsule was denoted as TPP@MC4. The average particle diameter of TPP@MC4 is 10 μm.

(5) TPP-S @MC5

Shell agent: A microcapsulation process was executed so that a phenoxy resin YP-50 (Tohto Kasei Co., Ltd., weight average molecular weight 60,000-80,000, same hereafter) exhibits a thickness of 10 mass % relative to the core (TPP-S). The resulting microcapsule was denoted as TPP@MC5. The average particle diameter of TPP@MC5 is 10 μm.

(6) TPP-S @MC6

Shell agent: A microcapsulation process was executed so that a polyvinyl alcohol (Product Name: NH-18, Nippon Synthetic Chemical Industry Co., Ltd.) exhibits a thickness of 10 mass % relative to the core (TPP-S). The resulting microcapsule was denoted as TPP@MC6. The average particle diameter of TPP@MC6 is 10 μm.

(7) TPTP-S @MC7

Shell agent: A microcapsulation process was executed so that a phenoxy resin YP-50 exhibits a thickness of 10 mass % relative to the core (TPTP-S). The resulting microcapsule was denoted as TPTP@MC1. The average particle diameter of TPTP@MC1 is 10 μm.

3. Manufacture of Composition

The components shown in Table 1 to Table 3 are mixed in the amounts (parts by mass) shown in the same tables using a reduced pressure stirring apparatus to manufacture a composition.

The figures with "eq" as units for an amount of the curing agent in Table 1 and Table 2 are equivalent weights for active hydrogen in the curing agent relative to the epoxy groups (active hydrogen/epoxy group).

In Table 1, the microcapsule that encapsulates the compound expressed in Formula (I) is shown by an amount (parts by mass) as a microcapsule.

TABLE 1

| Example I | | 1 | 2 | 3 | 4 | 5 | 13 | 6 | 7 | 8 | 9 | 10 | 11 | 12 | 14 |
|---|---|---|---|---|---|---|---|---|---|---|---|---|---|---|---|
| Epoxy Resin | | 100 | 100 | 100 | 100 | 100 | 100 | 100 | 100 | 100 | 100 | 100 | 100 | 100 | 100 |
| Curing Agent | Curing Agent (1) | | | | 0.9 eq | | | | | | | | | | |
| | Curing Agent (2) | | | | | | | | | | 0.9 eq | | | | |
| Curing Accelerator | TPP-S@MC1 | 3.3 | | | | | | 3.3 | | | | | | | |
| | TPP-S@MC2 | | 3.6 | | | | | | | 3.6 | | | | | |
| | TPP-S@MC3 | | | 3.3 | | | | | | | 3.3 | | | | |
| | TPP-S@MC4 | | | | 3.3 | | | | | | | 3.3 | | | |
| | TPP-S@MC5 | | | | | 3.3 | | | | | | | 3.3 | | |
| | TPP-S@MC6 | | | | | | 3.3 | | | | | | | 3.3 | |
| | TPTP-S@MC1 | | | | | | | | 3.3 | | | | | | 3.3 |
| 150° C. Gel Time | | 7 sec | 7 sec | 7 sec | 7 sec | 7 sec | 7 sec | 11 sec | 21 sec | 21 sec | 21 sec | 21 sec | 21 sec | 28 sec | 20 sec |
| Viscosity (units Pa·s) | Initial Viscosity | 5 | 4.9 | 4.9 | 4.9 | 5 | 5 | 4.9 | 6.2 | 5.3 | 5.2 | 5.2 | 5.5 | 5.2 | 5.2 |
| | Viscosity after Storage | 5.45 | 5.3 | 5.2 | 5.2 | 5.3 | 5.25 | 5.2 | 6.72 | 5.72 | 5.52 | 5.8 | 5.8 | 5.8 | 5.46 |
| Viscosity Increase Rate | | 9% | 8% | 6% | 6% | 6% | 5% | 6% | 9% | 8% | 6% | 6% | 6% | 6% | 5% |

TABLE 2

| Comparative Example 1 | | 1 | 2 | 3 | 4 | 5 | 6 |
|---|---|---|---|---|---|---|---|
| Epoxy Resin | | 100 | 100 | 100 | 100 | 100 | 100 |
| | Curing Agent (1) | 0.9 eq | | | | | |
| | Curing Agent (2) | | 0.9 eq | | | | |
| | Curing Agent (3) | | | | | 50 | |
| | Curing Agent (4) | | | | | | 50 |
| Curing Accelerator | TPP-S | 3 | | 3 | | | |
| | TPTP-S | | 3 | | 3 | | |
| | TPP-S@MC1 | | | | | 6.6 | 6.6 |
| 150° C. Gel Time | | 6 sec | 10 sec | 19 sec | 25 sec | at least 10 min | at least 10 min |
| Viscosity (units Pa·s) | Initial Viscosity | 5.1 | 5.1 | 5.3 | 5.3 | 300 | 312 |
| | Viscosity after Storage | 7.65 | 7.65 | 7.95 | 7.95 | 324 | 337 |
| Viscosity Increase Rate | | 50% | 50% | 50% | 50% | 8% | 8% |

TABLE 3

| Comparative Example II | 1 | 2 | 3 | 4 |
|---|---|---|---|---|
| Epoxy Resin | 100 | 100 | 100 | 100 |
| Phenol NOVOLAK resin curing agent | 50 | 50 | | |
| Phenol aralkyl resin curing agent | | | 83 | |
| Anhydride curing agent | | | | 91 |
| TPP-S | | 6 | 6 | 6 |
| TPP | 6 | | | |
| 150° C. Gel Time | >10 min | >10 min | >10 min | >10 min |
| Viscosity (units Pa·s) Initial Viscosity | 300 | 300 | 800 | 90 |
| Viscosity after Storage | 324 | 324 | 856 | 95.4 |
| Viscosity Increase Rate | 8% | 8% | 7% | 6% |

The respective components shown in Table 1 to Table 3 are as shown below.

Epoxy resin: EP4100E (ADEKA Co., Ltd.) Bisphenol A epoxy resin, epoxy equivalent 188 g/mol Curing agent (1): TMTG represented by the formula below: trimethylolpropane tris(thioglycolate), Yodo Kagaku Co., Ltd.

Chemical Formula 8

$(HSCH_2COOCH_2)_3CC_2H_5$

Curing agent (2): mercaptosilane condensate as represented by the formula below (Z6362H, Dow Corning Toray Co., Ltd.)

Chemical Formula 9

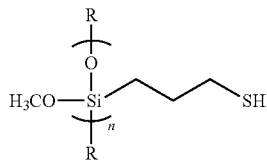

Wherein, n is 6-8.

Curing agent (3): product name: PN, Phenol NOVOLAK (Nippon Kayaku Co., Ltd.).

Curing agent (4): product name: XYLOK-4L xylylene glycol/phenol condensate (Mitsui Chemicals Inc.)

TPP-S@MC1-TPP-S@MC6, TPTP-S @MC1: microcapsule encapsulating the compound expressed by Formula (I) manufactured as described above.

TPP-S: Compound expressed by Formula (6) below, Hokko Chemical Industry Co., Ltd.

Chemical Formula 6

$$\left(\underset{3}{\left(\bigcirc\right)}\right)-PB-\left(\underset{3}{\left(\bigcirc\right)}\right) \quad (6)$$

TPTP-S: Compound expressed by Formula 7 below, Hokko Chemical Industry Co., Ltd.

Chemical Formula 7

$$\left(\underset{3}{\left(Me-\bigcirc\right)}\right)-PB-\left(\underset{3}{\left(\bigcirc\right)}\right) \quad (7)$$

Phenol NOVOLAK resin curing agent: MEH-8000H (Meiwa Plastic Industries Ltd.)
Phenol aralkyl resin curing agent: MEH-7800S (Meiwa Plastic Industries Ltd.)
Anhydride curing agent: RIKACID MT-500 (New Japan Chemical Co., Ltd.)
TPP: triphenolphosphine resin curing agent, Tokyo Chemical Industry Co., Ltd.

As is clear from the results shown in Table 1 to Table 3, Comparative Examples I-1~4 that contain an epoxy resin, a compound expressed by Formula (I) and a polythiol as a curing agent, and in which the compound expressed by Formula (I) is not encapsulated by a thermoplastic resin, exhibit a viscosity increase rate that exceeds 10% and therefore has an adverse effect on storage stability. Comparative Examples 1-5, 6 that contain a phenol resin or a condensate of a phenol resin in substitution for containing a polythiol exhibit an adverse affect on rapid curability.

Comparative Example II-1 that includes TPP as a curing accelerator and contains a phenol resin as a curing agent, and Comparative Examples II-2~4 that include TPP-S as a curing accelerator and contain a phenol resin as a curing agent in substitution for the polythiol exhibit an adverse effect on rapid curability.

In contrast, Examples I-1~14 exhibit a viscosity increase rate of less than 10%, exhibit excellent storage stability and maintain excellent rapid curability.

4. Evaluation

The gel time, viscosity, and viscosity increase rate of the composition obtained as described below were evaluated using the following method. The results are shown in Table 4 to Table 6.
(1) Gel Time (Rapid Curability): The same as 1.(1) above.
(2) Viscosity: The same as 1.(2) above.
(3) Viscosity Increase Rate (Storage Stability): The evaluation as in 1.(3) was performed with the exception that an evaluation standard for the viscosity increase rate was employed in which a viscosity increase rate of less than 5% was deemed to be capable of use as a thermosetting epoxy resin composition.

5. Manufacture of Microcapsule Type Curing Accelerator (Manufacture of Microcapsule Having a Core of the Curing Accelerator Expressed by Formula (1))

The microcapsule was prepared using a spray dry method in the same manner as 2. above.
(1) TPP-S@MC50% (Microcapsule having shell thickness corresponding to 50 mass % of Core Weight)

A powdered substance (microcapsule having a thickness of 50 mass %) is obtained by mixing 50 g of a curing accelerator solution which TPP-S (core agent. 10 g, melting point 205° C., Hokko Chemical Industry Co., Ltd., same hereafter) is suspended in a solvent: ethyl acetate (40 g) and a polyvinyl alcohol resin (PVA) solution [polyvinyl alcohol resin (product name NH-18, Nippon Synthetic Chemical Industry Co., Ltd., same hereafter), PVA amount in PVA solution: 10 g] dissolved in a solvent: 100 g of ethyl acetate, and spray drying using the above spray drying apparatus. The resulting microcapsule type curing accelerator is denoted as TPP-S@MC50%. The average particle diameter of TPP-S@MC50% is 10 μm.
(2) TPP-S@MC10% (Microcapsule having Shell Thickness corresponding to 10 mass % of Core Weight)

A powdered substance (microcapsule having a thickness of 10 mass %) is obtained by mixing 50 g of a curing accelerator solution which TPP-S (10 g) is suspended in a solvent: ethyl acetate (40 g) and a PVA solution (PVA amount in PVA solution: 1 g) dissolved in a solvent: 10 g of ethyl acetate, and spray drying using the above spray drying apparatus. The resulting microcapsule type curing accelerator is denoted as TPP-S@MC10%. The average particle diameter of TPP-S@MC10% is 10 μm.

6. Manufacture of Silica Microcapsule Type Curing Accelerator

Out of the components shown in Table 4, the microcapsule type curing accelerator and the globular silica are mixed in the amounts shown in the table (parts by mass) to thereby manufacture a silica microcapsule type curing accelerator.

7. Manufacture of Composition

Compositions were manufactured in the Examples shown in Table 4 by adding the remaining components shown in Table 4 to the microcapsule type curing accelerator obtained in the above manner in the amounts shown in the table (parts by mass) and mixing using a reduced pressure stirring apparatus.

Composition were manufactured in the Examples shown in Table 5 and the Comparative Examples shown in Table 6 using the components in the amounts shown in the table (parts by mass) and mixing using a reduced pressure stirring apparatus.

The figures with "eq" as units for an amount of the thiol curing agent in Table 4 and Table 5 are equivalent weights for active hydrogen in the curing agent relative to the epoxy groups (active hydrogen/epoxy group).

TABLE 4

| Example II | | 1 | 2 | 3 | 4 | 5 | 6 | 7 | 8 | 9 | 10 |
|---|---|---|---|---|---|---|---|---|---|---|---|
| Epoxy Resin | | 100 | 100 | 100 | 100 | 100 | 100 | 100 | 100 | 100 | 100 |
| Thiol Curing Agent | | 65.8 | 65.8 | 65.8 | 65.8 | 65.8 | 65.8 | 65.8 | 65.8 | 65.8 | 65.8 |
| | | (0.9 eq) | (0.9 eq) | (0.9 eq) | (0.9 eq) | (0.9 eq) | (0.9 eq) | (0.9 eq) | (0.9 eq) | (0.9 eq) | (0.9 eq) |
| Microcapsule Type Curing Accelerator | TPP-S@MC50% | 6 | 6 | 6 | 6 | 6 | 6 | | | | |
| | TPP-S@MC10% | | | | | | | 3.33 | 3.33 | 3.33 | 3.33 |

TABLE 4-continued

| Example II | 1 | 2 | 3 | 4 | 5 | 6 | 7 | 8 | 9 | 10 |
|---|---|---|---|---|---|---|---|---|---|---|
| Globular Silica 1 | 5 | 10 | 20 | | | | 10 | 20 | | |
| Globular Silica 2 | | | | 5 | 10 | 20 | | | 10 | 20 |
| 150° C. Gel Time | 23 sec | 23 sec | 24 sec | 23 sec | 23 sec | 24 sec | 21 sec | 22 sec | 21 sec | 22 sec |
| Viscosity (units Pa · s) Initial Viscosity | 6.0 | 8.0 | 10.0 | 6.0 | 8.0 | 10.0 | 7.5 | 8.5 | 7.5 | 8.5 |
| Viscosity after Storage | 6.12 | 8.12 | 10.1 | 6.24 | 8.28 | 10.3 | 7.7 | 8.6 | 7.0 | 8.6 |
| Viscosity Increase Rate | 2.0% | 1.5% | 1.0% | 4.0% | 3.5% | 3.0% | 2.0% | 1.5% | 2.0% | 1.5% |

TABLE 5

| Example III | 1 | 2 | 3 | 4 | 5 | 6 |
|---|---|---|---|---|---|---|
| Epoxy Resin | 100 | 100 | 100 | 100 | 100 | 100 |
| Thiol Curing Agent | 65.8 (0.9 eq) | 65.8 (0.9 eq) | 65.8 (0.9 eq) | 65.8 (0.9 eq) | 65.8 (0.9 eq) | 65.8 (0.9 eq) |
| Microcapsule Type Curing Accelerator TPP-S@MC50% | 6 | 6 | | | | |
| TPP-S@MC10% | | | 3.33 | 3.33 | 3.33 | 3.33 |
| Globular Silica 1 | 5 | | 10 | 20 | | |
| Globular Silica 2 | | 5 | | | 10 | 20 |
| 150° C. Gel Time | 23 sec | 23 sec | 21 sec | 22 sec | 21 sec | 22 sec |
| Viscosity (units Pa · s) Initial Viscosity | 6.0 | 8.0 | 7.5 | 8.5 | 7.5 | 8.5 |
| Viscosity after Storage | 6.12 | 8.13 | 7.7 | 8.64 | 7.65 | 8.63 |
| Viscosity Increase Rate | 2.2% | 1.6% | 2.1% | 1.6% | 2.0% | 1.5% |

TABLE 6

| Comparative Example III | 1 | 2 |
|---|---|---|
| Epoxy Resin | 100 | 100 |
| Thiol Curing Agent | 65.8 | 65.8 |
| Curing Accelerator 1 | 3 | |
| Curing Accelerator 2 | | 3 |
| 150° C. Gel Time | 19 sec | 25 sec |
| Viscosity (units Pa · s) Initial Viscosity | 5.3 | 5.3 |
| Viscosity after Storage | 7.95 | 7.95 |
| Viscosity Increase Rate | 50% | 50% |

The respective components shown in Table 4 to Table 6 are as shown below.
Epoxy resin: Same as Table 1
Thiol curing agent: Same as Curing Agent (2) in Table 2
Microcapsule type curing accelerator (TPP-S@MC50%, TPP-S@MC10%): Microcapsule type curing accelerator manufactured as described above.
Curing accelerator 1: same as TPP-S in Table 2.
Curing accelerator 2: same as TPTP-S in Table 2.
Globular silica 1: silica globular minute particle whose surface is processed to be hydrophobic (product name: X-24-9404, Average particle diameter 50 nm, Shin-Etsu Chemical Co., Ltd.)
Globular silica 2: silica globular minute particle whose surface is processed to be hydrophobic (product name: X-24-9163A, Average particle diameter 110 nm, Shin-Etsu Chemical Co., Ltd.)

As is clear from the results shown in Table 4 to Table 6, Comparative Examples III-1, 2 that do not use a hydrophobic globular silica exhibit a high viscosity increase rate and therefore adversely affect storage stability.

In contrast, Example II and Example III display a low viscosity increase rate and excellent storage stability.

The invention claimed is:

1. A one-pack thermosetting epoxy resin composition including:
   an epoxy resin,
   a polythiol as a curing agent, and
   a curing accelerator for an epoxy resin composition including a microcapsule type curing accelerator in which a compound represented by Chemical Formula (I) is encapsulated in thermoplastic resin:

Chemical Formula I

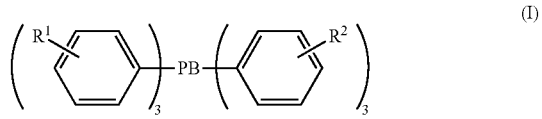

Wherein: R1 and R2 respectively represent a hydrogen atom or an alkyl group.

2. The one-pack thermosetting epoxy resin composition according to claim 1, wherein the thermoplastic resin is at least one selected from a group consisting of a urethane resin, a styrene butadiene elastomer, a polyvinyl acetal resin, a polyvinyl alcohol, and a phenoxy resin.

3. The one-pack thermosetting epoxy resin composition according to claim 2 wherein the amount of active hydrogen included in the curing agent is an equivalent amount of 0.5 to 2.5 relative to epoxy groups in the epoxy resin, and the amount of the compound represented in Formula (I) is 1 to 50 parts by mass relative to 100 parts by mass of epoxy resin.

4. The one-pack thermosetting epoxy resin composition according to claim 2, further comprising a hydrophobic globular silica.

5. The one-pack thermosetting epoxy resin composition according to claim 4 wherein the amount of active hydrogen included in the curing agent is an equivalent amount of 0.5 to 2.5 relative to epoxy groups in the epoxy resin, and the amount of the compound represented in Formula (I) is 1 to 50 parts by mass relative to 100 parts by mass of epoxy resin.

6. The one-pack thermosetting epoxy resin composition according to claim 4, wherein the microcapsule type curing accelerator is covered by the globular silica.

7. The one-pack thermosetting epoxy resin composition according to claim 6 wherein the amount of active hydrogen included in the curing agent is an equivalent amount of 0.5 to 2.5 relative to epoxy groups in the epoxy resin, and the amount of the compound represented in Formula (I) is 1 to 50 parts by mass relative to 100 parts by mass of epoxy resin.

8. The one-pack thermosetting epoxy resin composition according to claim 1, further comprising a hydrophobic globular silica.

9. The one-pack thermosetting epoxy resin composition according to claim 8 wherein the amount of active hydrogen included in the curing agent is an equivalent amount of 0.5 to 2.5 relative to epoxy groups in the epoxy resin, and the amount of the compound represented in Formula (I) is 1 to 50 parts by mass relative to 100 parts by mass of epoxy resin.

10. The one-pack thermosetting epoxy resin composition according to claim 8, wherein the microcapsule type curing accelerator is covered by the globular silica.

11. The one-pack thermosetting epoxy resin composition according to claim 10 wherein the amount of active hydrogen included in the curing agent is an equivalent amount of 0.5 to 2.5 relative to epoxy groups in the epoxy resin, and the amount of the compound represented in Formula (I) is 1 to 50 parts by mass relative to 100 parts by mass of epoxy resin.

12. The one-pack thermosetting epoxy resin composition according to claim 1 wherein the amount of active hydrogen included in the curing agent is an equivalent amount of 0.5 to 2.5 relative to epoxy groups in the epoxy resin, and the amount of the compound represented in Formula (I) is 1 to 50 parts by mass relative to 100 parts by mass of epoxy resin.

* * * * *